United States Patent [19]

Ukon

[11] Patent Number: 5,745,369
[45] Date of Patent: Apr. 28, 1998

[54] METHOD AND APPARATUS FOR DETERMINING A PEAK POSITION OF A SPECTRUM

[75] Inventor: Juichiro Ukon, Miyanohigashi-machi, Japan

[73] Assignee: Horiba Ltd., Kyoto, Japan

[21] Appl. No.: 453,765

[22] Filed: May 30, 1995

[51] Int. Cl.⁶ .................. G01J 3/42; G01N 21/25
[52] U.S. Cl. .......... 364/487; 364/49.8; 364/485; 250/339.12
[58] Field of Search .................. 364/487, 485, 364/498, 553; 436/171; 73/23.37; 250/227.23, 339.12; 356/303, 319, 326

[56] References Cited

U.S. PATENT DOCUMENTS

| | | | |
|---|---|---|---|
| 4,510,573 | 4/1985 | Boyce et al. | 364/498 |
| 4,642,778 | 2/1987 | Hieftje et al. | 364/498 |
| 4,878,194 | 10/1989 | Nakatsugawa et al. | 364/487 |
| 5,023,804 | 6/1991 | Hoult | 364/498 |
| 5,252,488 | 10/1993 | Purdie | 436/71 |
| 5,291,426 | 3/1994 | Collins et al. | 364/498 |
| 5,360,972 | 11/1994 | DiFoggio et al. | 250/339.12 |
| 5,418,826 | 5/1995 | Sato et al. | 378/48 |

FOREIGN PATENT DOCUMENTS

| | | |
|---|---|---|
| 50-137184 | 10/1975 | Japan . |
| 60-11172 | 1/1985 | Japan . |

*Primary Examiner*—Emanuel T. Voeltz
*Assistant Examiner*—Bryan Bui
*Attorney, Agent, or Firm*—Price, Gess & Ubell

[57] ABSTRACT

A method and apparatus of determining peak positions in a spectrum of data includes providing a spectrum of energy to a sample and measuring the spectrum of energy after contact with the sample to provide a range of spectrum data representative of the sample. The spectrum data is then subjected to a differential calculus operation of an even number to provide a differential spectrum data. The spectrum data and differential spectrum data are combined whereby the characteristics of the components in the sample are enhanced. The combined data is then analyzed so that the components in the sample can be identified.

25 Claims, 6 Drawing Sheets

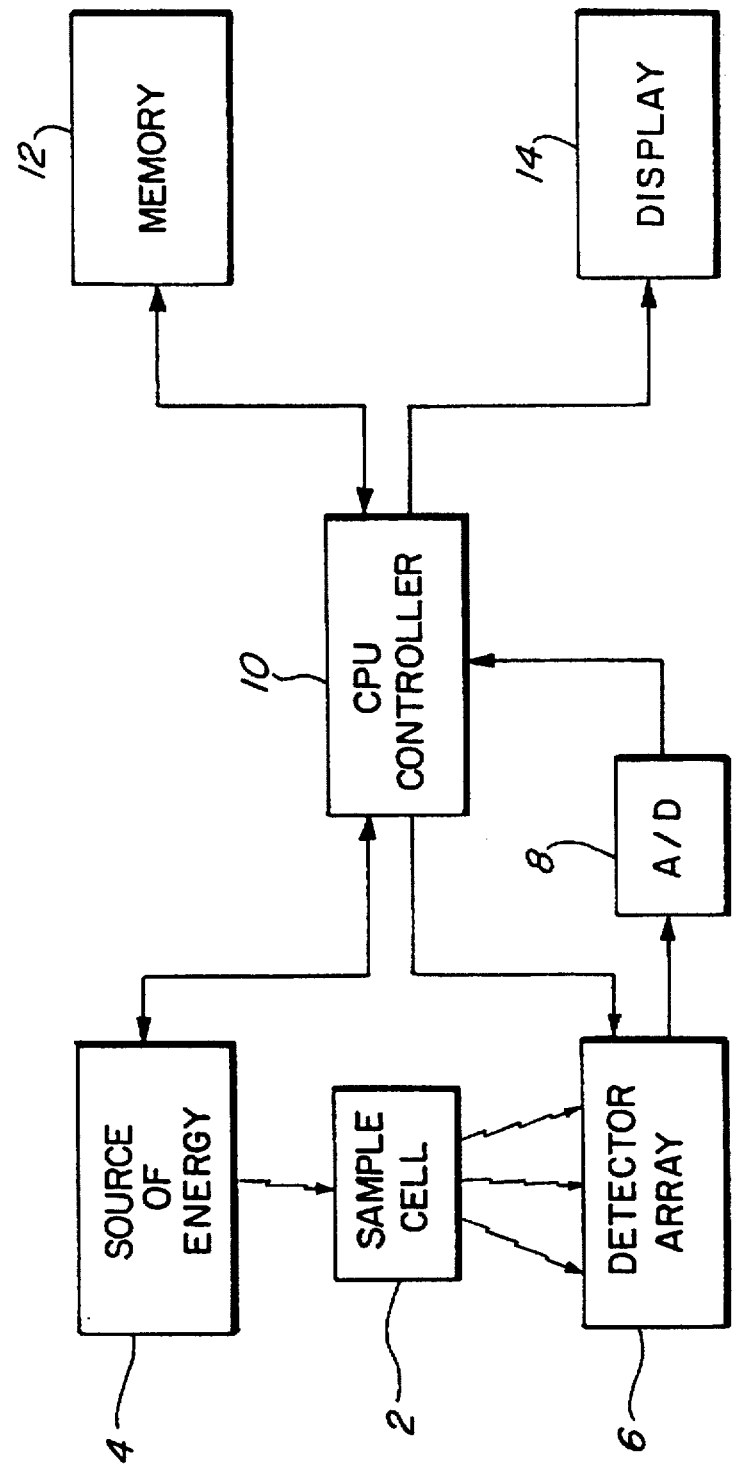

METHOD AND APPARATUS FOR DETERMINING A PEAK POSITION OF A SPECTRUM

BACKGROUND OF THE INVENTION

1. Field of the Invention

The present invention relates to a method and apparatus of determining a large number of peak positions in an energy spectrum obtained by an absorption method, a luminous method, a fluorescent method, and the like.

2. Description of Related Art

In order to search for output peaks in an energy spectrum, for example, when individual peaks turn upward along a vertical axis, as shown in FIG. 3(A), groups of the peaks which convex upward in a series of digitalized (dispersed) data have been selected in turn (for example, in an order of ①→②→③) from one having the largest datum of a central portion above an appointed threshold value, SL, or the appointed number.

However, according to the above-described method, it has been required that a base line, BL, across the spectrum is both flat and broad and that no large peaks exist, as shown in FIG. 3(A), but it is difficult to obtain such an ideal spectrum. For example, when the base line BL is varied, as shown in FIG. 3(B), places, which are not desired to be searched, are inadvertently searched as the peaks. In addition, when a broad and large absorption zone AZ exists, as shown in FIG. 3(C), it can be misdetected as a peak position due to a high peak thereof, even though it is not to be searched. So, in such a case, predetermined search zones, SZ, within which peaks are to be searched, have been appointed, as shown in FIG. 3(c).

As described above, conventionally excessively searched peaks have been eliminated to search again or the search zones have been limited, so that a disadvantage has occurred in that it takes both time and labor to obtain desired peaks.

OBJECTS AND SUMMARY OF THE INVENTION

The present invention has been achieved paying attention to the above-described matters, and it is an object of the present invention to provide a method and apparatus of efficiently detecting a large number of positions of sharp and high (deep) peaks in a spectrum in an efficient manner.

In order to achieve the above-described object, the spectrum is subjected to a differential calculus operation of an even-numbered order and the obtained differential spectrum is suitably mixed with the above originally-described spectrum among corresponding points by an operation to obtain mixture spectrum on the basis of which the peak positions are readily determined.

A person measuring a spectrum usually wishes the peak positions to be sharp and high (deep) in an absorption zone (luminous zone). In the differential spectrum of the second order obtained by subjecting the spectrum to a differential calculus of the second order, the resultant product will exhibit a larger fluctuation with an increase of the absorption zone (luminous zone) in sharpness. Consequently, even though the base line of the original spectrum is not flat, the differential spectrum of the second order will become flat and, thus, also a broad absorption zone will be reduced in fluctuation as compared with the original absorption zone. Many positions of the sharp and high (deep) peaks in the spectrum can be efficiently detected by suitably operating such a differential spectrum of the second order and the original spectrum followed by mixing of them.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 4 is a schematic diagram of one form of the present invention; and

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a method and apparatus of determining a peak position of a spectrum.

The preferred embodiment of the present invention will be described below with reference to the drawings.

Figure 1A:
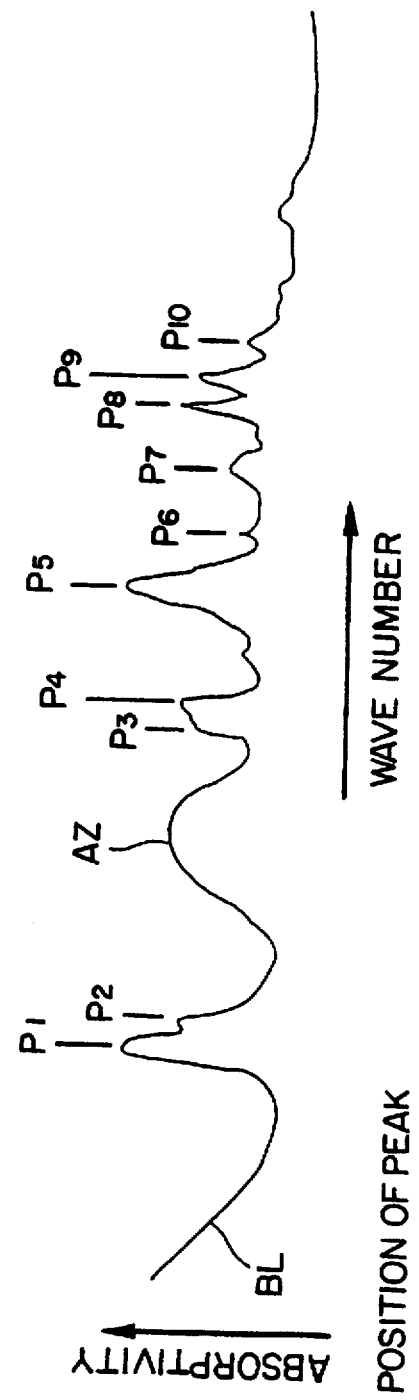
FIG. 1(A) shows one example of an infrared energy absorption spectrum that can be typically obtained with a measurement instrument.
Figure 1B:
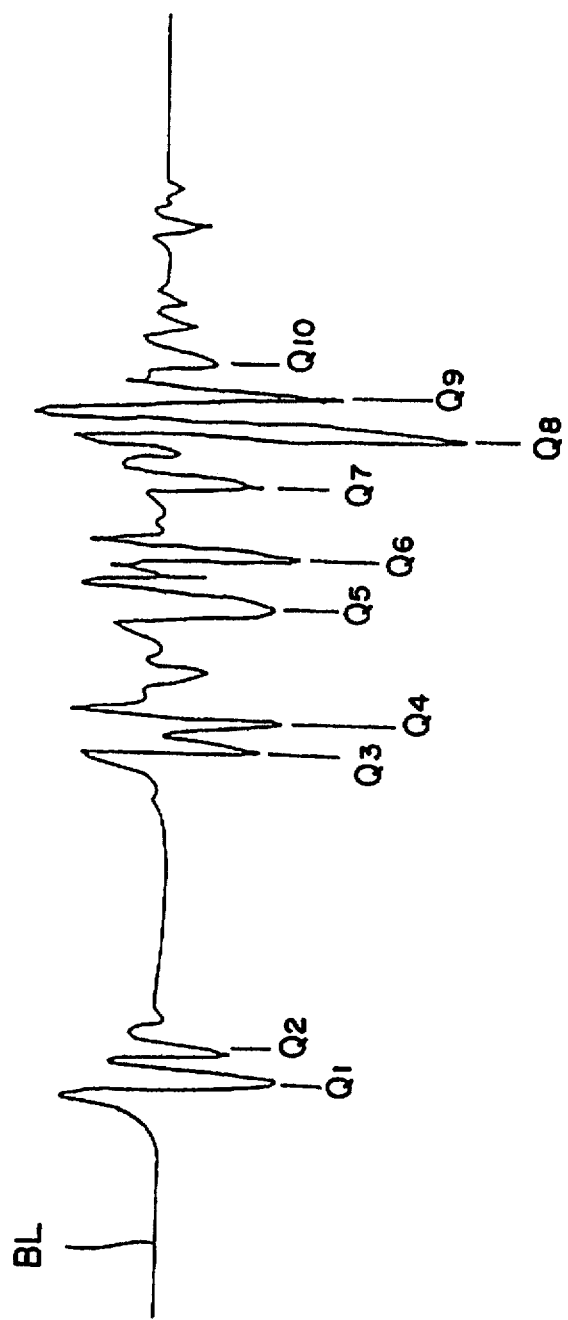
FIG. 1(B) shows a differential spectrum obtained by subjecting the spectrum shown in FIG. 1(A) to a differential calculus of the second order.

FIG. 1(A) shows one example of an infrared energy absorption spectrum (the vertical axis: absorptivity; the horizontal axis: wave number). Referring to FIG. 1(A), reference marks $P_1$ to $P_{10}$ designate positions where peaks are to be detected. In this spectrum, a base line BL rises at a left end and a broad and high absorption zone AZ exists between peak $P_2$ and peak $P_3$. FIG. 1(B) shows a differential spectrum obtained by subjecting an energy spectrum show in FIG. 1(A) (hereinafter referred to as the original spectrum) to a differential calculus of the second order. Referring to FIG. 1(B), reference marks $Q_1$ to $Q_{10}$ correspond to the reference marks $P_1$ to $P_{10}$ in the original spectrum. In this differential spectrum, the base line BL is not risen differently from the original spectrum, and also the broad absorption zone hardly appears between the peak $Q_2$ and the peak $Q_3$. Note, the relatively moderate variation in value of BL and AZ is basically rendered flat after the differential operation.

And, of $P_1$ to peak $P_{10}$ in the original spectrum, peak $P_5$ is the largest (highest) and peak $P_6$ is the smallest (lowest). On the contrary, in the case where a differential calculus operation is carried out two times, then there are characteristics where the fluctuation is increased as the peak is sharpened, or undergoes a rapid rate of change, so that, of $Q_1$ to $Q_{10}$ in the differential spectrum, the fluctuation of the peak $Q_6$ will grow considerably larger as a result of this operation. Similarly, also the fluctuations of the peaks $Q_8$, $Q_9$ will also grow considerably large, as seen in FIG. 1(B).

The peak positions in the original spectrum can be detected in turn from the deepest (largest in fluctuation) peak on the basis of merely the differential spectrum but small peaks (for example, the peak $P_6$) in the original spectrum are also increased in fluctuation in the differential spectrum by carrying out the differential calculus operation two times, if they are sharp, so that they are also preferentially detected.

To take advantage of this operation, the present invention further provides a suitable mixing of the original spectrum data with the derived differential spectrum data. As a result, the desired peaks can be detected by taking into account their heights (depths) and the above-described problems could be avoided.

To accomplish the purpose of the present invention, the original spectrum data may be mixed with the differential spectrum data by either an adding or multiplying operation of the corresponding points among themselves. In this case, weight may be suitably given to both spectra. A method and operation of mixing both spectra will be described below.

At first, as to a method of mixing the original spectrum with the differential spectrum by an adding operation where both spectra are added, the vertical axes in both spectra are different in scale, so that it is necessary to formalize the respective data between 0 to 1. Provided that the formalized original spectrum and the formalized differential spectrum is $\{a'\}$ and $\{b'\}$, respectively, the mixture spectrum $\{c'\}$ is obtained by adding as expressed by the following expression (1):

$$\{c'\} = X \cdot \{a'\} + Y \cdot \{b'\} \tag{1}$$

wherein X, Y are weighting coefficients; X, Y$\geq$0; X+Y= constant.

In the resultant mixture spectrum $\{c'\}$, obtained in the above-described manner, the peak positions are preferentially detected in turn from the highest (deepest) peak. In this case, where both spectra are mixed by adding, both spectra are opposite in fluctuating direction according to circumstances, as show in FIG. 1(A), (B), so that it is preferable to multiply one set of the data by $-1$.

In addition, it is sufficient that the coefficients X, Y in the expression (1) are set in dependence upon which is to be preferentially detected, that is, the height or the sharpness of a peak. Furthermore, any problems that the base line BL may vary and/or a broad absorption zone AZ would be detected, are apt to be generated as an extent, to which the coefficient X is increased to be larger than the coefficient Y.

As an alternative method of mixing the original spectrum data with the differential spectrum data, it is possible to apply a multiplying step so that the original spectrum $\{a\}$ is multiplied by the differential spectrum $\{b\}$ to obtain a mixture spectrum $\{c\}$. It is not necessary to formalize the respective data differently from the above-described case where both spectra are added. In addition, also in the case where the original spectrum $\{a\}$ is multiplied by the differential spectrum $\{b\}$, it is preferable that the differential spectrum is multiplied by $-1$ when the direction of fluctuation is opposite. The mixture spectrum $\{c\}$, obtained when both spectra were mixed by a multiplication operation, is expressed by the following expression (2):

$$\{c\} = \{a + |X|\} \cdot \{b + |Y|\} \tag{2}$$

And, if $|X| < |Y|$ in the above-described expression (2), the respective peaks can be detected with a preferential selection of their height, while, if $|X| > |Y|$ in the expression (2), the respective peaks can be detected by preferentially selecting the sharpness.

Figure 2:
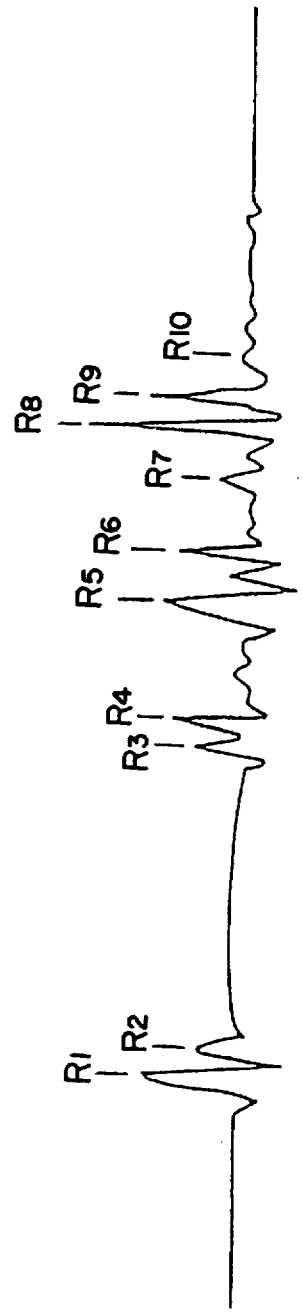
FIG. 2 shows a resultant mixture spectrum obtained by multiplying the spectrum shown in FIG. 1(A) by the spectrum shown in FIG. 1(B)
Figure 3A:
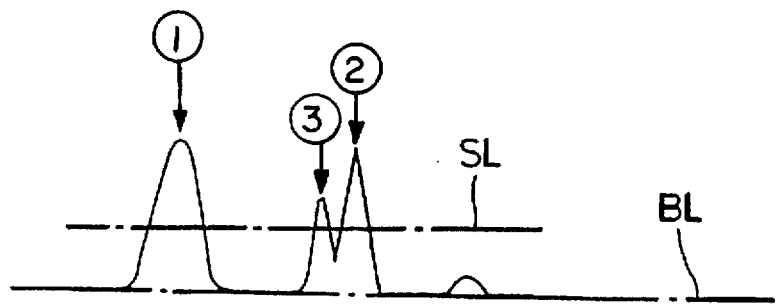
FIGS. 3(A), 3(B), and 3(C) are diagrams for describing the defects of a conventional method.
Figure 3B:
Figure 3C:
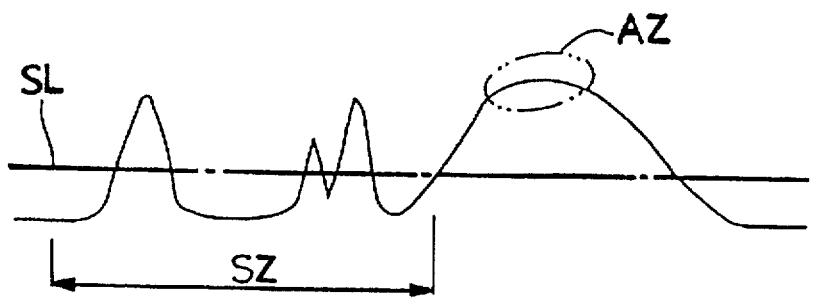

FIG. 2 shows a mixture spectrum obtained by the above-described multiplication. Referring to FIG. 2, reference marks $R_1$ to $R_{10}$ correspond to reference marks $P_1$ to $P_{10}$ in the original spectrum shown in FIG. 1(A) and to reference marks $Q_1$ to $Q_{10}$ in the differential spectrum shown in FIG. 1(B). In this example, both the coefficients $|X|$, $|Y|$ were selected so as to be zero.

The following matters can be found from a comparison of the original spectrum shown in FIG. 1(A) with the mixture spectrum shown in FIG. 2.

That is to say, $P_5 > P_1 > P_8 > P_4 > P_2 > P_9 > P_3 > P_7 > P_{10} > P_6$ in height in the original spectrum, while $P_8 > P_9 > P_6 > P_4 > P_1 > P_5 > P_7 > P_3 > P_2 > P_{10}$ in sharpness in the original spectrum. On the contrary, $R_8 > R_9 > R_1 > R_5 > R_4 > R_6 > R_3 > R_2 > R_7 > R_{10}$ in the mixture spectrum.

On the basis of this data, it can be found that the high and sharp peaks (the absorption zones characteristic to the spectrum) can be preferentially detected and any misdetection due to the fluctuation of a base line BL, a hindrance by the broad absorption zones and the like can be remarkably reduced by mixing the original spectrum with the differential spectrum.

In addition, although the original spectrum was subjected to a differential calculus of the second order in the above-described preferred embodiment, the present invention is not limited to this procedure. A similar effect can be achieved even though the original spectrum is subjected to a differential calculus operation of an even-numbered order, such as the fourth order and the sixth order.

Referring to FIG. 4, an example of an application of the present invention in the form of a measurement instrument to determine the constituent elements from a sample is disclosed. The sample can be placed within a sample cell 2 and subjected to radiation, such as a bandwidth of infrared energy, from a source of energy 4. A detector array 6 can measure the radiation as it is transmitted through or reflected off of the sample. Assuming that the radiation is absorbed by different sample components at different amounts, an output can be determined by a detector array 6. The source of radiation can have a variable wavelength frequency to provide various wavelength points across the energy spectrum. The output of the detector array 6 could be digitized by an A/D converter 8, and the digital data can be submitted to a CPU controller 10, such as a microprocessor. A memory 12 such as a RAM memory can store the digital data both in the raw state and as the operand of operations by the CPU controller. The CPU controller 10 can be programmed to perform various operations on the detected data, and the results of the measurement can be displayed to a user on a display 14. Obviously, the output could also be printed in hard copy. The CPU controller 10 can have an algorithm that can effectuate the differential calculus operations such as providing a first and second differentiation of the energy spectrum data with a subsequent multiplying or adding to achieve the desired results. As can be appreciated, various weighting coefficients and leveling factors can also be stored in the memory 12, depending on the specific sample that is being tested.

While not shown, it can also be appreciated that the advantages of the present invention can be also be accomplished in an analog manner through the use of known operational amplifiers. Thus, an analog output can be provided from the sampling cell with an appropriate timing to identify a respective wavelength point. A differential amplifier can be connected to a constant current source, and then a second differential amplifier can be used to operate on the output from the first differential amplifier. As can be appreciated, any even number of differential amplifiers can be utilized. As can be further appreciated, filter circuits can be utilized to minimize any electrical noise, and thereby prevent noise pulses and spikes from being mistaken for data. As can be readily appreciated, the output of the differential amplifier can also be applied to a summing amplifier, along with the original data of the energy spectrum from a parallel amplifier circuit (assuming the time delay is inconsequential). A summation operation can then be utilized prior to determining the peak positions. Likewise, the analog computation can include a multiplication of two voltages representing the initial energy spectrum data and the differentiation data resulting from the operation of the operational amplifiers. For example, multiplication can be done with a log operation with appropriate log circuits wherein a pair of log amplifiers provide an output which is then applied to a summer circuit. Reference can be made to "Electronic Integrated Circuits and Systems" by F. C. Fitchen, Van Nostrand Reinhold Company (1970), which is incorporated herein by reference to disclose known circuit components that can be utilized in an analog version of the present invention.

Figure 5:
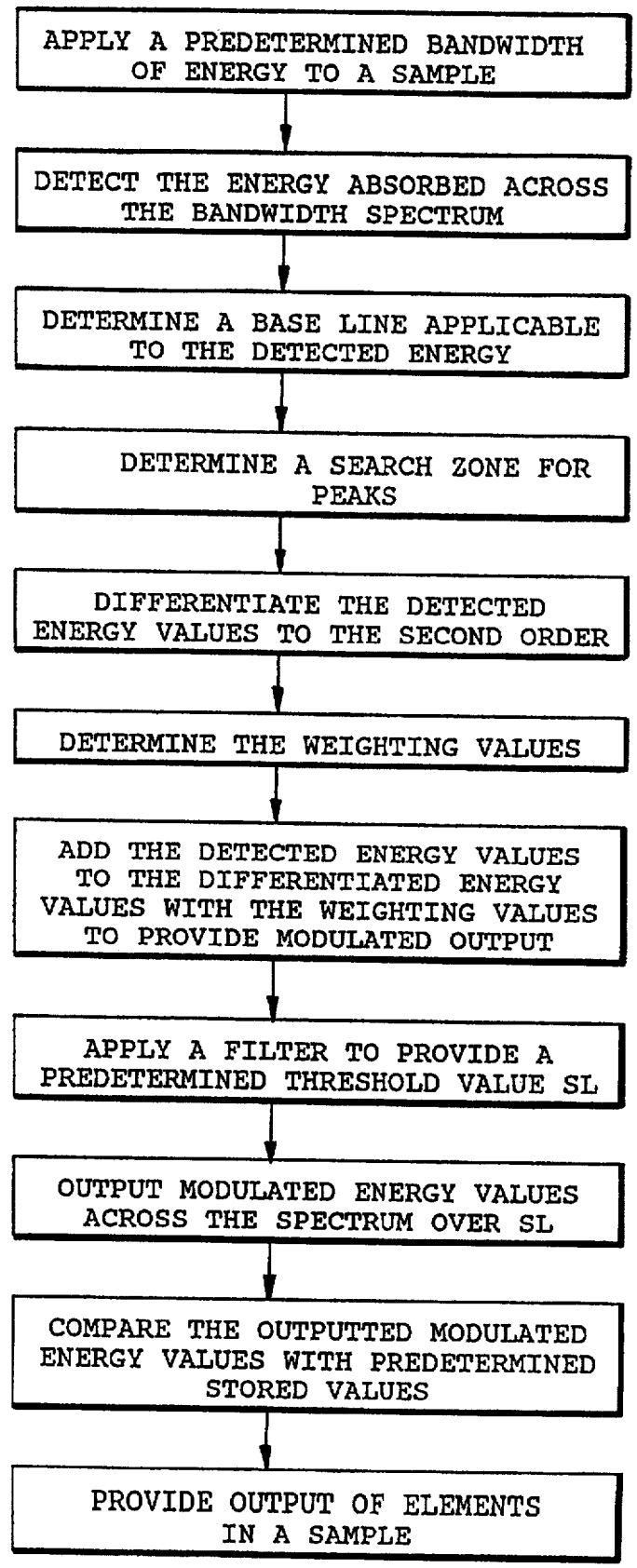
FIG. 5 is a schematic flow chart of the procedures of the present invention.

Referring to FIG. 5, a flow chart defines a program that can be utilized in the embodiment of the present invention shown in FIG. 4. First, there can be an application of a predetermined bandwidth of energy to a sample that has been placed within the sample cell 2. The energy that has been absorbed across that spectrum bandwidth can be determined, for example, by a detector or a detector array 6. A baseline is then determined that is applicable to the detected energy values. Additionally, a predetermined search zone for the desired peaks to be detected can be identified. The energy data levels that have been computed can be differentiated to the second order. Appropriately-determined weighting factors, depending upon the sample and the energy spectrum, can then be derived and applied. The original detected energy values and the differentiated energy values that have been appropriately adjusted with the weighting values are utilized to provide a modulated output. The modulated output can be a result of a summing operation or a multiplication operation. A filter can then be provided to determine a predetermined threshold value SL. The output modulated energy values can then be detected across the predetermined search zone of the spectrum. These output modulated energy values can then be compared with predetermined stored values to identify the components in the sample. The identified elements can then be provided as an output on the display 14.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of determining peak positions in a spectrum of data, comprising the steps of:
   receiving a range of data over the spectrum;
   storing the range of spectrum data;
   subjecting a duplication of the range of data to a differential calculus operation of an even number order to obtain a differential spectrum data;
   combining the initial range of spectrum data with the differential spectrum data by multiplying them together; and
   determining the peak positions from the combined initial and differential spectrum data.

2. A method of determining peak positions as set forth in claim 1 including applying weighting values to the spectrum data and the differential spectrum data prior to combining them.

3. A method of determining peak positions as set forth in claim 1 including setting a threshold value which must be exceeded before determining the peak positions.

4. A method of determining peak positions as set forth in claim 1 including comparing the determined peak positions with predetermined values to identify the peak positions and providing a display of the result.

5. A measurement apparatus for determining components in a sample, comprising:
   a source of energy to provide a spectrum that will interact with components in a sample;
   means for holding a sample to receive the spectrum of energy;
   means for measuring the spectrum of energy after contact with the sample to provide a range of spectrum data representative of the contact with the sample;
   differential means for operating upon the range of data by a differential calculus operation of an even number order to provide differential spectrum data;
   means for combining the spectrum data with the differential spectrum data by multiplying the spectrum data by the differential data, to provide combined data whereby the characteristics of the components are enhanced; and
   means for determining, from the combined data, the components in the sample.

6. A measurement apparatus as set forth in claim 5 wherein the means for combining includes adding the spectrum data with the differential spectrum data.

7. A measurement apparatus as set forth in claim 5 wherein the means for determining includes defining peak positions in the combined data.

8. A measurement apparatus as set forth in claim 7 wherein the means for determining includes comparing the peak position with predetermined values to identify the components.

9. A measurement apparatus as set forth in claim 8 wherein the means for determining further includes a CPU controller and a memory for storing the spectrum data.

10. The measurement apparatus as set forth in claim 5 further including means for applying weighting values to the spectrum data and the differential spectrum data prior to combining them.

11. A method of determining peak positions in a spectrum of data provided by irradiating a sample with a band of energy, comprising the steps of:
    positioning a sample;
    applying a band of energy to the sample over a predetermined spectrum;
    measuring the spectrum of energy after contact with the sample to provide a range of spectrum data;
    operating upon the spectrum data by a differential calculus operation of an even number order to obtain a differential spectrum data;
    combining the initial range of spectrum data with the differential spectrum data by multiplying the spectrum data by the differential spectrum data; and
    determining the peak positions from the combined initial and differential spectrum data.

12. A method of determining peak positions as set forth in claim 11 including applying weighting values to the spectrum data and the differential spectrum data prior to combining them.

13. A method of determining peak positions as set forth in claim 11 including setting a threshold value which must be exceeded before determining the peak positions.

14. A method of determining peak positions as set forth in claim 13 including comparing the determined peak positions with predetermined values to identify the peak positions and providing a display of the result.

15. A method of determining peak positions in a spectrum of data, comprising the steps of:

receiving a range of data over the spectrum;

storing the range of spectrum data;

subjecting a duplication of the range of data to a differential calculus operation of an even number order to obtain a differential spectrum data;

combining the initial range of spectrum data with the differential spectrum data;

setting a threshold value which must be exceeded before determining a peak position; and after the threshold value has been exceeded; and determining the peak positions from the combined initial and differential spectrum data.

16. A method of determining peak positions as set forth in claim 15 including combining the spectrum data with the differential spectrum data by adding them together.

17. A method of determining peak positions as set forth in claim 15 including comparing the determined peak positions with predetermined values to identify the peak positions and providing a display of the result.

18. A method of determining peak positions as set forth in claim 17 including combining the spectrum data with the differential spectrum data by multiplying them together.

19. A method of determining peak positions as set forth in claim 15 including applying weighting values to the spectrum data and the differential spectrum data prior to combining them.

20. A method of determining peak positions in a spectrum of data provided by irradiating a sample with a band of energy, comprising the steps of:

positioning a sample;

applying a band of energy to the sample over a predetermined spectrum;

measuring the spectrum of energy after contact with the sample to provide a range of spectrum data;

operating upon the spectrum data by a differential calculus operation of an even number order to obtain a differential spectrum data;

combining the initial range of spectrum data with the differential spectrum data;

setting a threshold value which must be exceeded before determining the peak positions; and determining the peak positions from the combined initial and differential spectrum data when the threshold value is exceeded.

21. A method of determining peak positions as set forth in claim 20 including combining the spectrum data with the differential spectrum data by adding them together.

22. A method of determining peak positions as set forth in claim 20 including applying weighting values to the spectrum data and the differential spectrum data prior to combining them.

23. A method of determining peak positions as set forth in claim 20 including combining the spectrum data with the differential spectrum data by adding them together.

24. A method of determining peak positions as set forth in claim 20 including combining the spectrum data with the differential spectrum data by multiplying them together.

25. A method of determining peak positions as set forth in claim 20 including comparing the determined peak positions with predetermined values to identify the peak positions and providing a display of the result.

* * * * *